United States Patent
Xue et al.

(10) Patent No.: US 10,848,283 B2
(45) Date of Patent: Nov. 24, 2020

(54) METHOD AND DEVICE FOR OPERATING MACHINE TYPE DEVICE IN WIRELESS COMMUNICATION SYSTEM

(71) Applicant: Samsung Electronics Co., Ltd., Suwon-si, Gyeonggi-do (KR)

(72) Inventors: Peng Xue, Suwon-si (KR); Cheol Jeong, Seongnam-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 129 days.

(21) Appl. No.: 15/745,592

(22) PCT Filed: Jul. 22, 2016

(86) PCT No.: PCT/KR2016/008051
§ 371 (c)(1),
(2) Date: Jan. 17, 2018

(87) PCT Pub. No.: WO2017/014600
PCT Pub. Date: Jan. 26, 2017

(65) Prior Publication Data
US 2018/0212726 A1  Jul. 26, 2018

Related U.S. Application Data

(60) Provisional application No. 62/195,571, filed on Jul. 22, 2015, provisional application No. 62/195,425, (Continued)

(51) Int. Cl.
*H04W 4/70* (2018.01)
*H04L 5/00* (2006.01)
(Continued)

(52) U.S. Cl.
CPC ............ *H04L 5/0048* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS 9,510,134 B2    11/2016   Oh
2010/0322178 A1  12/2010  Li et al.
(Continued)

FOREIGN PATENT DOCUMENTS

CN    101931485 A    12/2010
CN    103053196 A    4/2013
(Continued)

OTHER PUBLICATIONS

NEC Group, Downlink Reference Signal Enhancement for Low Cost MTC, 3GPP TSG RAN WG1 Meeting #73, R1-132334, XP050698100, May 20-24, 2013, Fukuoka, Japan.
(Continued)

*Primary Examiner* — Gregory B Sefcheck
*Assistant Examiner* — Amarnauth G Persaud
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method by a terminal for transmitting and
(Continued)

receiving a signal in a mobile communication system according to an embodiment of the present disclosure includes receiving at least one of information related to a sequence corresponding to a first reference signal, information related to an antenna port corresponding to the first reference signal, and information related to transmission power corresponding to the first reference signal; and receiving the first reference signal based on at least one of the received information.

8 Claims, 19 Drawing Sheets

Related U.S. Application Data filed on Jul. 22, 2015, provisional application No. 62/232,860, filed on Sep. 25, 2015, provisional application No. 62/232,840, filed on Sep. 25, 2015, provisional application No. 62/251,378, filed on Nov. 5, 2015, provisional application No. 62/276,468, filed on Jan. 8, 2016, provisional application No. 62/291,246, filed on Feb. 4, 2016, provisional application No. 62/307,904, filed on Mar. 14, 2016, provisional application No. 62/307,818, filed on Mar. 14, 2016.

(51) Int. Cl.
*H04L 27/26* (2006.01)
*H04W 52/32* (2009.01)

(52) U.S. Cl.
CPC .......... *H04L 5/0064* (2013.01); *H04L 5/0092* (2013.01); *H04L 27/26* (2013.01); *H04W 4/70* (2018.02); *H04W 52/325* (2013.01); *H04L 5/0037* (2013.01)

(56) References Cited

U.S. PATENT DOCUMENTS

| | | | |
|---|---|---|---|
| 2013/0039199 | A1 | 2/2013 | Liao et al. |
| 2013/0089067 | A1 | 4/2013 | Ji et al. |
| 2014/0269597 | A1 | 9/2014 | Park et al. |
| 2014/0307700 | A1 | 10/2014 | Seo et al. |
| 2015/0016239 | A1* | 1/2015 | Yi .......................... H04J 11/003 370/201 |
| 2015/0023197 | A1* | 1/2015 | Iraji .................. H04W 36/0061 370/252 |
| 2015/0071387 | A1 | 3/2015 | Luo et al. |
| 2015/0117338 | A1 | 4/2015 | Janis et al. |
| 2015/0117381 | A1 | 4/2015 | Khoshnevis et al. |
| 2015/0207601 | A1* | 7/2015 | Kim ...................... H04L 5/0048 370/329 |
| 2015/0245378 | A1 | 8/2015 | Kim et al. |
| 2015/0341908 | A1 | 11/2015 | Wang et al. |
| 2015/0365926 | A1 | 12/2015 | Long |
| 2016/0037501 | A1 | 2/2016 | Hamzeh et al. |
| 2016/0056977 | A1 | 2/2016 | Wang et al. |
| 2016/0174014 | A1* | 6/2016 | You ...................... H04B 7/2656 370/312 |
| 2016/0192376 | A1 | 6/2016 | Lee et al. |
| 2016/0316442 | A1 | 10/2016 | Seo et al. |
| 2016/0374109 | A1 | 12/2016 | Rico Alvarino et al. |
| 2017/0064685 | A1 | 3/2017 | Rico Alvarino et al. |
| 2017/0070994 | A1 | 3/2017 | Rico Alvarino et al. |
| 2017/0094621 | A1 | 3/2017 | Xu et al. |
| 2017/0134881 | A1* | 5/2017 | Oh ....................... H04W 56/001 |
| 2017/0187488 | A1 | 6/2017 | Rico Alvarino et al. |
| 2017/0187563 | A1 | 6/2017 | Shin et al. |
| 2017/0208592 | A1 | 7/2017 | Rico Alvarino et al. |
| 2017/0237584 | A1 | 8/2017 | Yan et al. |
| 2017/0251443 | A1 | 8/2017 | Shin et al. |
| 2018/0006763 | A1* | 1/2018 | Kim ...................... H04L 1/0026 |
| 2018/0013529 | A1 | 1/2018 | You et al. |
| 2018/0146404 | A1* | 5/2018 | Zhang .................. H04W 48/12 |

FOREIGN PATENT DOCUMENTS

| | | |
|---|---|---|
| CN | 104040919 A | 9/2014 |
| EP | 2 941 072 A1 | 11/2015 |
| WO | 2011/085191 A1 | 7/2011 |
| WO | 2014/101810 A1 | 7/2014 |
| WO | 2014-153777 A1 | 10/2014 |
| WO | 2015-012507 A1 | 1/2015 |
| WO | 2015-021318 A2 | 2/2015 |
| WO | 2016/111549 A1 | 7/2016 |
| WO | 2017/035238 A1 | 3/2017 |
| WO | 2017/123405 A1 | 7/2017 |

OTHER PUBLICATIONS

LG Electronics, RS design for NB-IoT downlink control and data transmissions, 3GPP TSG RAN WG1 NB-IoT Ad-Hoc Meeting, R1-160116, XP051053436, Jan. 18-20, 2016, Budapest, Hungary.
Sony, MTC Operation with a Narrowband PDCCH, 3GPP TSG-RAN WG1 Meeting #80, R1-150428, XP050933636, Feb. 9-13, 2015, Athens, Greece.
3rd Generation Partnership Project; Technical Specification Group Radio Access Network; Evolved Universal Terrestrial Radio Access (E-UTRA); Physical Channels and Modulation (Release 9), 3GPP TS 36.211 V9.1.0, pp. 1-85, XP051296785, Mar. 21, 2010.
Huawei et al., NB-IOT—downlink physical layer concept description, R1-156462, 3GPP TSG RAN WG1 Meeting #83, Nov. 7, 2015, Anaheim, USA.
Sony, Coexistence of EMTC and NB-IOT, R1-156693, 3GPP TSG RAN WG1 Meeting #83, Nov. 7, 2015, Anaheim, USA.
LG Electronics, Discussions on downlink control channel design for NB-IoT, R1-156883, 3GPP TSG RAN WG1 Meeting #83, Nov. 7, 2015, Anaheim, USA.
Samsung, "PBCH coverage enhancements for low-cost MTC UEs", 3GPP Draft, R1-131015, PBCH Coverage Enhancements FGR MTC, 3rd Generation Partnership Project (3GPP), Mobile Competence Centre, 650, Route Des Lucioles, F-06921 Sophia-Antipolis Cedex, France vol. RAN WG1, Chicago, USA, Apr. 15, 2013-Apr. 19, 2013, Apr. 6, 2013, XP050696995.
MCC Support, "Draft Report of 3GPP TSG RAN WG1 #84 V0.1.0", 3GPP Draft, DRAFT_MINUTES_REPORT_RAN1#84_V010, 3rd Generation Partnership Project (3GPP), Mobile Competence Centre, 650, Route Des Lucioles, F-06921 Sophia-Antipolis Cedex, France vol. RAN WG1, Busan, South Korea, Apr. 11, 2016-Apr. 15, 2016, Feb. 22, 2016, XP051079501, Sect. 7.2.1.1.1: Comments to doc., R1-160918.
WI Rapporteur (Ericsson), "agreements for Rel-13 NB-IoT", 3GPP Draft, R1-161548, RANI Agreements for REL-13 NB-IOT, 3rd Generation Partnership Project (3GPP), Mobile Competence Centre, 650, Route Des Lucioles, F-06921 Sophia-Antipolis Cedex, France vol. RAN WG1, St. Julian's, Malta, Feb. 15, 201-Feb. 19, 2016, Mar. 2, 2016, XP051079462, Sect.s 7, 10, 11.
Intel Corporation, "Operation mode indication and channel raster for NB-IoT", 3GPP Draft, R1-160408, Intel—NB-IOT Rastermode, 3rd Generation Partnership Project (3GPP), Mobile Competence Centre, 650, Route Des Lucioles, F-06921 Sophia-Antipolis Cedex, France vol. RAN WG1, St Julian's, Malta, Feb. 15, 2016-Feb. 19, 2016, Feb. 6, 2016, XP051064167, Sect. 3.2.
MCC Support, "Draft Report of 3GPP TSG RAN WG1 #84 V0.1.0", 3GPP Draft, DRAFT_MINufES_REPORT_RAN1#84_V010, 3rd Generation Partnership Project (3GPP), Mobile Competence Centre, 650, Route Des Lucioles, F-06921 Sophia-Anti Polis Cedex, France vol. RAN WG1, Busan, South Korea, Apr. 11, 2016-Apr. 15, 2016, Feb. 22, 2016, XP051079501, Sect. 7.2.1.1.1, p. 32: Comments to doc.s, R1-160918, R1-161231.
Extended European Search Reports dated Sep. 4, 2019, issued in European Patent Application No. 19184102.2.
Extended European Search Reports dated Sep. 11, 2019, issued in European Patent Application No. 17766949.6.

(56) References Cited

OTHER PUBLICATIONS

U.S. Office Action dated Mar. 24, 2020, issued in U.S. Appl. No. 15/458,472.
Chinese Office Action dated Apr. 16, 2020, issued in Chinese Application No. 201680042282.9.
U.S Notice of Allowance dated Aug. 13, 2020, issued in U.S. Appl. No. 15/458,472.

* cited by examiner

FIG. 7
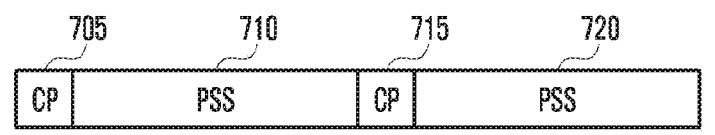
(a) Option 1
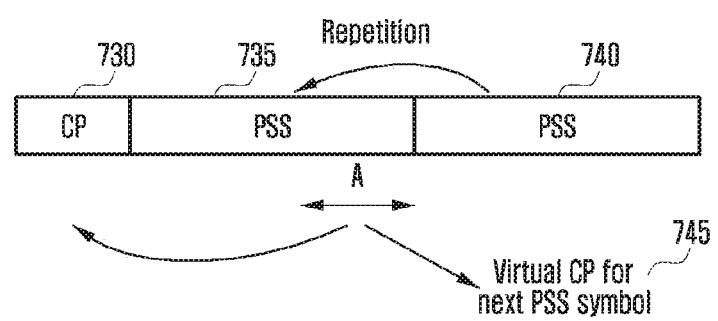
(b) Option 2

METHOD AND DEVICE FOR OPERATING MACHINE TYPE DEVICE IN WIRELESS COMMUNICATION SYSTEM

TECHNICAL FIELD

The present disclosure relates to a method and a device for operating a machine type device in a wireless communication system, and more particularly, to a method and a device that enable a machine type device to perform communication using signal transmission/reception information of an existing communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the development of the wireless communication system as described above, the necessity of IoT communication has increased, and there has been a need for a method and a device which can smoothly operate an IoT communication system in association with the existing communication system, and can efficiently use radio resources.

DISCLOSURE OF INVENTION

Technical Problem

The present disclosure has been made in order to solve the above problems, and an aspect of the present disclosure provides a method and a device which can smoothly perform signal transmission/reception in a wireless communication system. More specifically, an aspect of the present disclosure provides a method and a device which can efficiently use resources and can improve communication reliability by enabling an IoT device to receive information, such as a reference signal used in the existing communication system, and to perform channel estimation based on the received information.

Solution to Problem

In one aspect of the present disclosure, a method by a terminal for transmitting and receiving a signal in a mobile communication system includes receiving at least one of information related to a sequence corresponding to a first reference signal, information related to an antenna port corresponding to the first reference signal, and information related to transmission power corresponding to the first reference signal; and receiving the first reference signal based on at least one of the received information.

In another aspect of the present disclosure, a method by a base station for transmitting and receiving a signal in a mobile communication system includes transmitting at least one of information related to a sequence corresponding to a first reference signal, information related to an antenna port corresponding to the first reference signal, and information related to transmission power corresponding to the first reference signal; and transmitting the first reference signal.

In still another aspect of the present disclosure, a terminal in a mobile communication system includes a transceiver configured to transmit and receive a signal; and a controller configured to control the transceiver to receive at least one of information related to a sequence corresponding to a first reference signal, information related to an antenna port corresponding to the first reference signal, and information related to transmission power corresponding to the first reference signal, and to receive the first reference signal based on at least one of the received information.

In yet still another aspect of the present disclosure, a base station in a mobile communication system includes a transceiver configured to transmit and receive a signal; and a controller configured to control the transceiver to transmit at least one of information related to a sequence corresponding to a first reference signal, information related to an antenna port corresponding to the first reference signal, and information related to transmission power corresponding to the first reference signal, and to transmit the first reference signal.

Advantageous Effects of Invention

According to the aspects of the present disclosure, the communication system can efficiently use resources and thus can improve communication reliability. Further, according to the aspect of the present disclosure, since the IoT device uses the reference signal of the existing LTE communication system, reliability of the channel estimation can be improved, and the resources can be efficiently used.

BRIEF DESCRIPTION OF DRAWINGS

FIG. 7 is a diagram illustrating an example of a method for transmitting a primary synchronization signal (PSS) in an IoT communication system;

MODE FOR THE INVENTION

Figure 1:
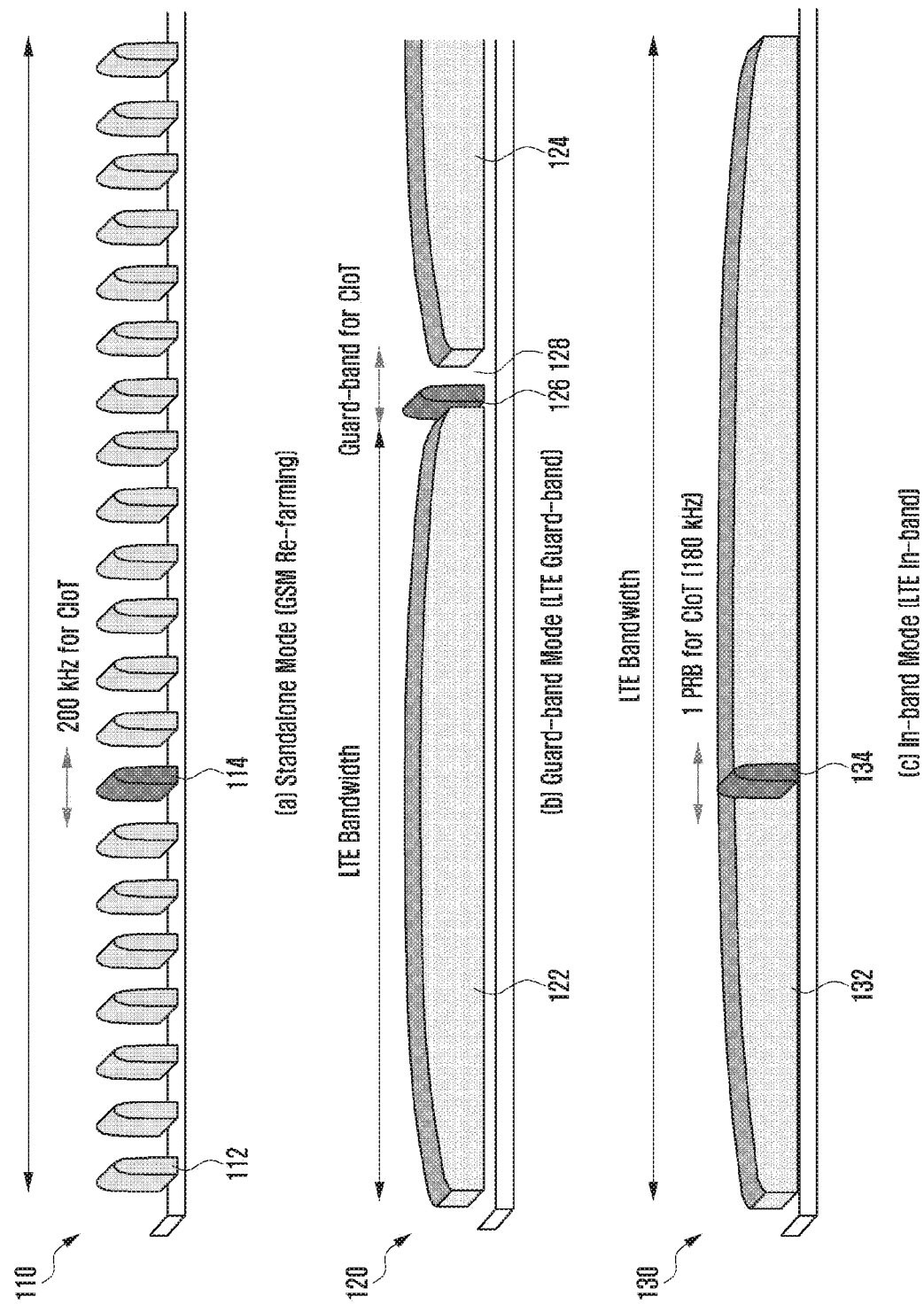
FIG. 1 is a diagram illustrating an example of a scenario in which an Internet of things (IoT) communication system can operate.

Hereinafter, embodiments of the present disclosure will be described in detail with reference to the accompanying drawings.

In describing the embodiments, explanation of the technical contents that are well known in the art to which the present disclosure pertains and are not directly related to the present disclosure will be omitted to avoid obscuring the subject matter of the present disclosure and to transfer the same more accurately.

For the same reason, in the accompanying drawings, some constituent elements are exaggerated, omitted, or roughly illustrated. Further, sizes of some constituent elements may not completely reflect the actual sizes thereof. In the drawings, the same drawing reference numerals are used for the same elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as FPGA or ASIC, which performs certain tasks. However, "unit" does not mean to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card.

Further, in an embodiment, a communication system explained as cellular Internet of things (cellular IoT (CIoT)) and narrow band Internet of things (NB-IoT) relates to matters that can be applied to the whole IoT communication system, and does not describe technical features limited to the respective embodiments.

In a CIoT network, one important feature is to require an improved coverage capable of performing machine type communications (MTC). For example, one typical scenario is to provide a water or gas measurement service through CIoT networks. At present, most existing MTC/CIoT systems take aim at a low-end application that can be properly processed by GSM/GPRS due to low costs of devices and good coverage of the GSM/GPRS. However, a larger number of CIoT devices are gradually deployed in this field, and this may cause a natural increase of dependence on the GSM/GPRS networks. Further, some CIoT systems take aim at standalone spreading scenarios through re-farming of a GSM carrier having a bandwidth of 200 kHz.

Further, with the activation of LTE deployment, operators desire to reduce the whole network maintenance and repair costs through minimization of the number of RATs. The MTC/CIoT is a market having possibility of continuous expansion in future. This may cause the operators to bear the expenses in maintaining the plurality of RATs, and may prevent the operators from obtaining the maximum gains through their spectrums. In consideration of a large number of CIoT/MTC devices having high possibility, the whole resources required to provide services may become correspondingly important, and may be inefficiently allocated. Accordingly, it is necessary to seek a new solution for movement of the MTC/CIoT from a GSM/GPRS to an LTE network.

In the present disclosure, a new MTC/CIoT system is proposed, which can smoothly spread in various methods, for example, standalone, in a guard-band or the bandwidth of the existing cellular system (e.g., LTE).

FIG. 1 is a diagram illustrating an example of a scenario in which an Internet of things (IoT) communication system can operate.

Referring to FIG. 1, an IoT system occupies a narrow bandwidth in a frequency band, and for example, may use the minimum system bandwidth of 200 kHz (or 180 kHz) in both a downlink and an uplink. Due to the feature of the narrow band, the IoT system may spread through standalone, in the guard-band of the existing cellular system, or in the bandwidth of the existing cellular system.

More specifically, the IoT system may operate in at least one of a standalone mode 110 re-farmed in a GSM system, a mode 120 including a guard band in an LE system, and an in-band mode 130 operating in an LTE frequency bandwidth.

Since a physical resource block (PRB) bandwidth of the LTE system is 180 kHz, the IoT system may spread within a certain PRB in the whole bandwidth, which may be called an in-band mode. As an alternative, since the LTE system normally has a guard band from 200 kHz to 2 MHz (according to the system bandwidth of the LTE system), the IoT system may spread within a guard-band region of the LTE system, which may be called a guard-band mode. For example, the IoT system may spread in a standalone mode through re-farming of a GSM carrier having a bandwidth of 200 kHz.

In a standalone mode 110, one independent IoT carrier 114 may be configured among GSM carriers 112.

In the LTE system, in the mode 120 including the guard band, an IoT carrier 126 may be deployed between LTE carriers 122 and 124, and a guard band 128 may be deployed between them.

In the in-band mode 130, an IoT carrier 134 may be deployed in an LTE carrier 132.

Figure 2:
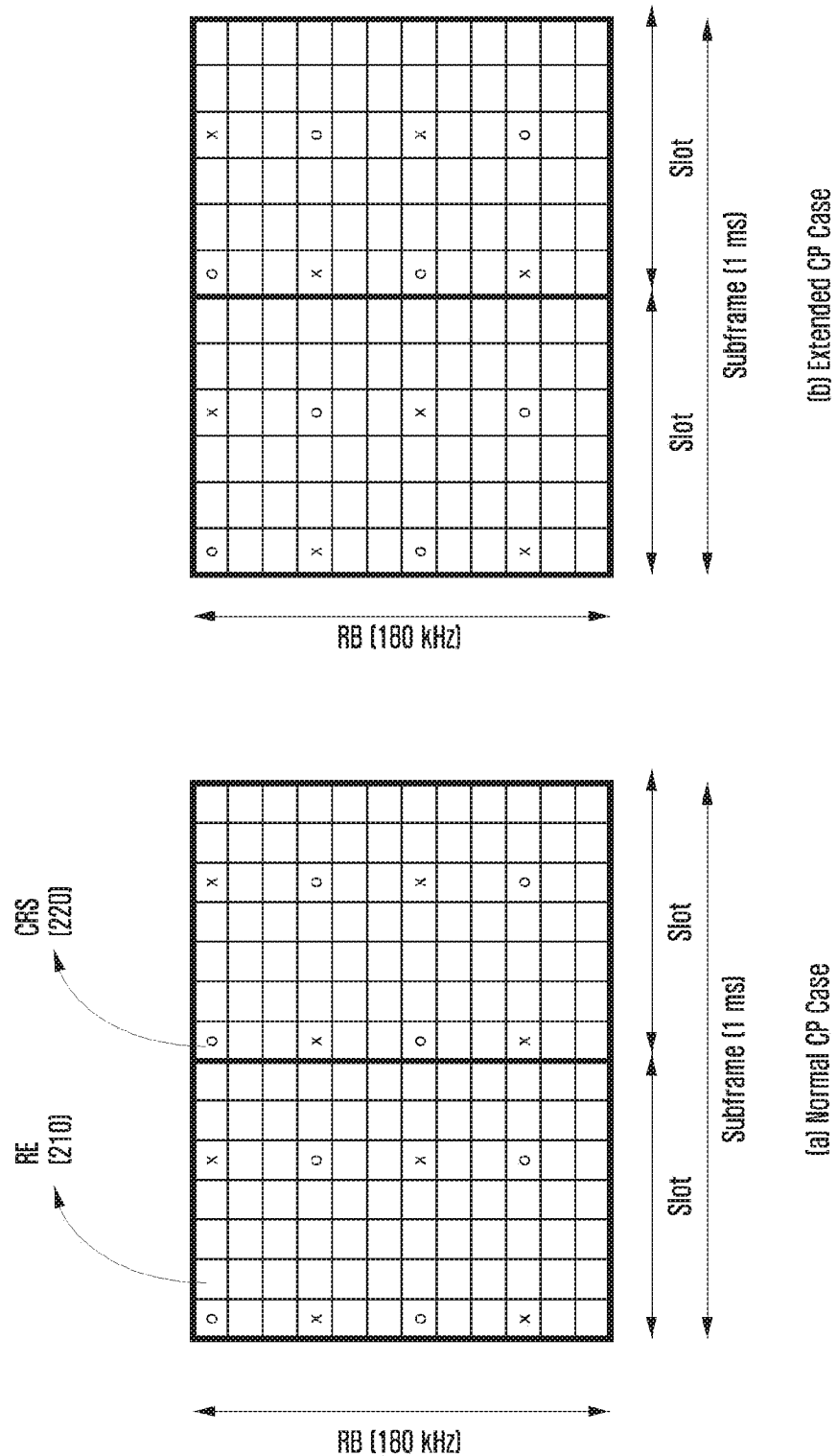
FIG. 2 is a diagram illustrating a resource grid for signal transmission/reception in an IoT communication system.

FIG. 2 is a diagram illustrating a resource grid for signal transmission/reception in an IoT communication system.

Referring to FIG. 2, one PRB resource grid may be configured for one subframe. The PRB resource grid may have a different configuration in accordance with the length of a CP, and one subframe may include two slots. Each slot may include at least one resource element (RE) 210, and at least one common reference signal (CRS) 220 may be transmitted in the resource grid.

Since the IoT system supports an LTE in-band deployment, this system may be designed in consideration of compatibility and coexistence with the existing LTE system. In order to prevent a negative influence from being exerted on the existing LTE system, system constituent elements used in the LTE, for example, waveforms and subcarrier spacing may be reused for the IoT system. For one subframe, one PRB resource grid may be configured in a similar manner to that in the LTE system.

Figure 3:
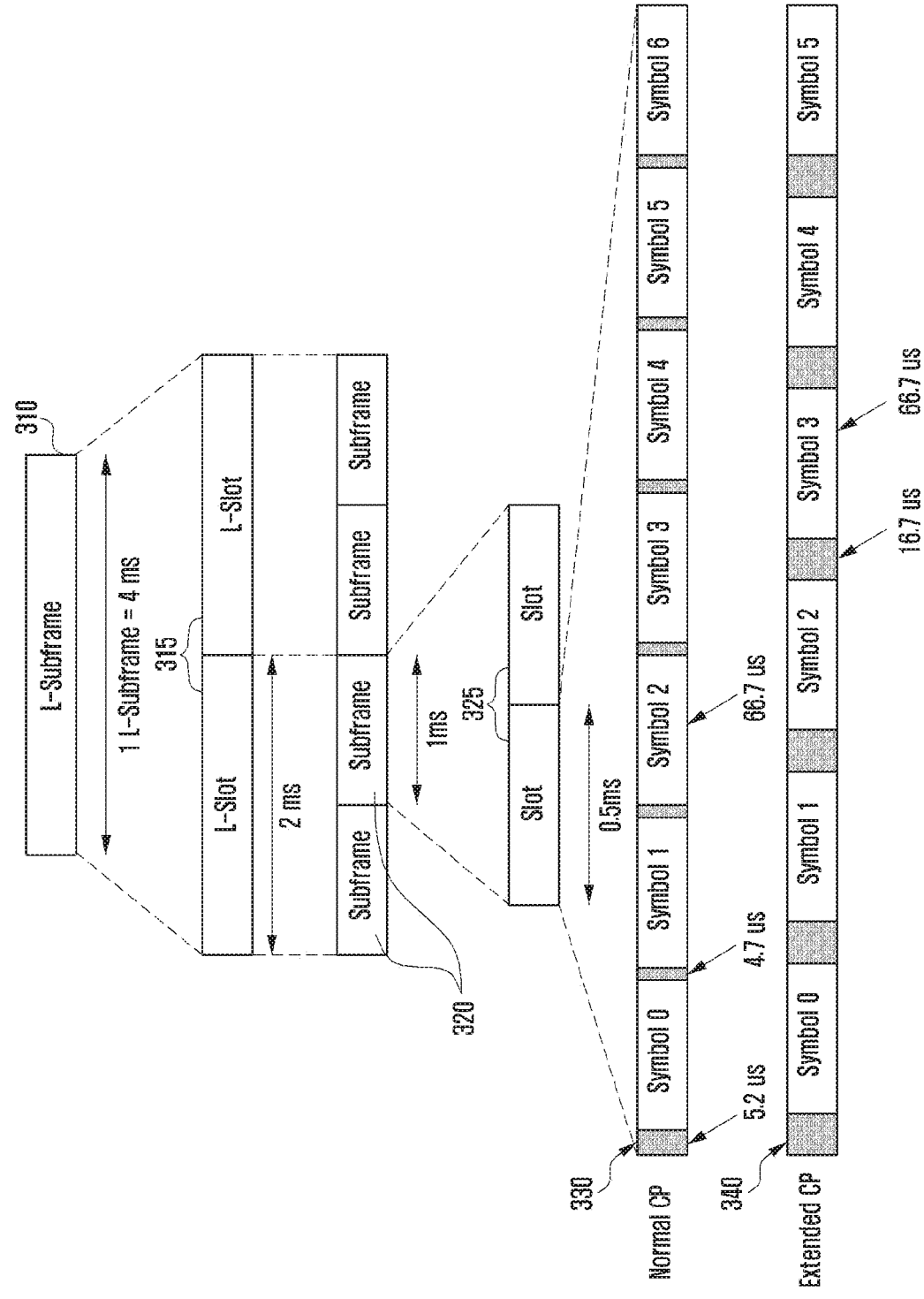
FIG. 3 is a diagram illustrating an L subframe structure that can be operated in an IoT communication system.

FIG. 3 is a diagram illustrating an L subframe structure that can be operated in an IoT communication system.

Referring to FIG. 3, an L subframe 310 that can be operated in an IoT communication system may include two L slots 315. Further, each L slot 315 may include two subframes 320. One subframe 320 may include two slots. Further, in the case of a normal CP, the slot 325 may include 6 symbols 334, whereas in the case of an extended CP, the slot 325 may include 5 symbols 344. The lengths of the respective symbols and CPs are the same as those as illustrated.

In an embodiment, since one PRB is used in the IoT system, a longer subframe unit may be defined as the minimum scheduling unit, and for example, the L-subframe 310 may include 4 subframes (4 ms). If a short scheduling unit is necessary, an L-slot (2 ms) 315 may be considered.

Figure 4:
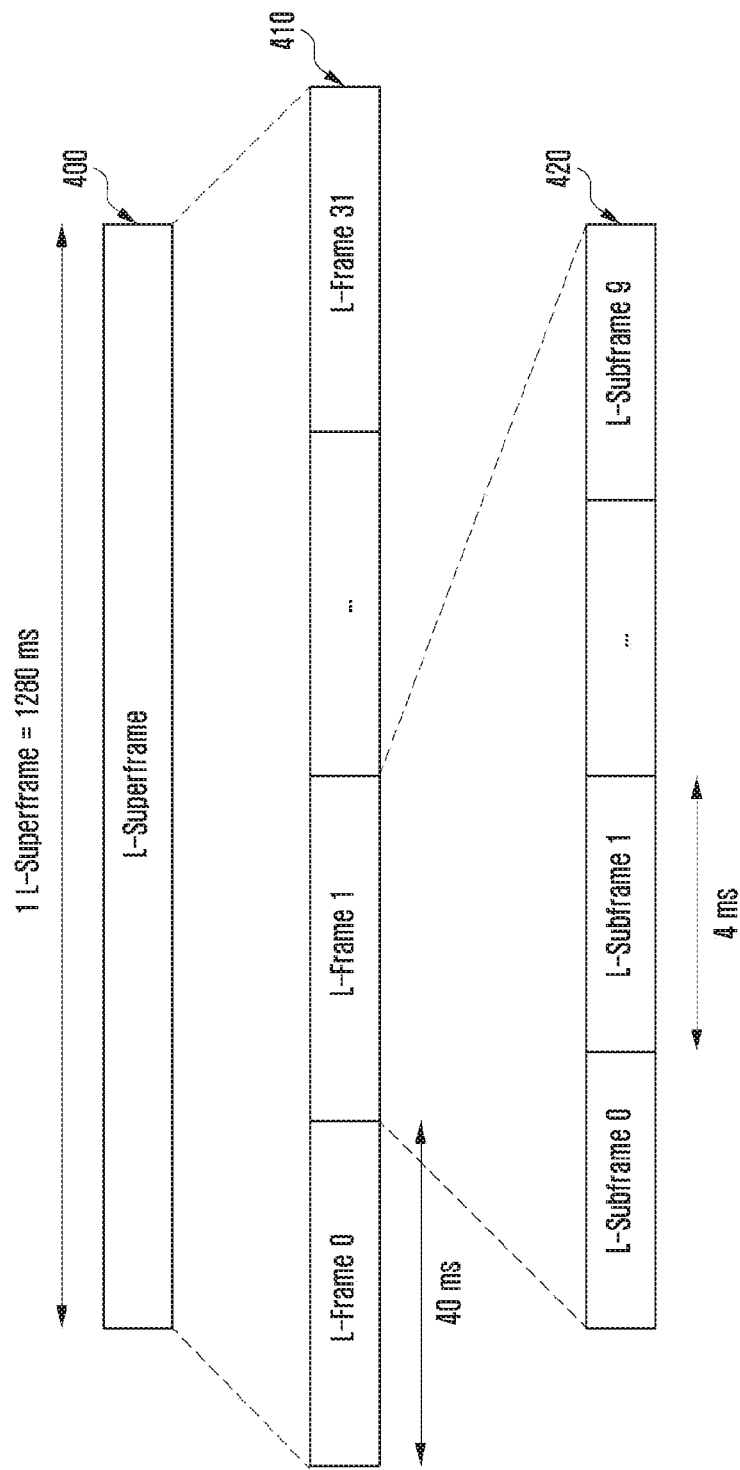
FIG. 4 is a diagram illustrating an L super subframe structure that can be operated in an IoT communication system.

FIG. 4 is a diagram illustrating an L super subframe structure that can be operated in an IoT communication system.

Referring to FIG. 4, an L superframe 400 that may be operated in the IoT communication system may include 32 L frames 410, and each L frame may include 10 subframes 420. In an embodiment, the L frame 410 may include 10 L-subframes 420, and may have duration of 40 ms. The duration of the L-frame may be aligned with a PBCH transmission time interval (TTI) in an LTE in which the PBCH is repeated four times for 40 ms. One L-superframe 400 may include 32 L-frames 410 having duration of 1280 ms.

Figure 5:
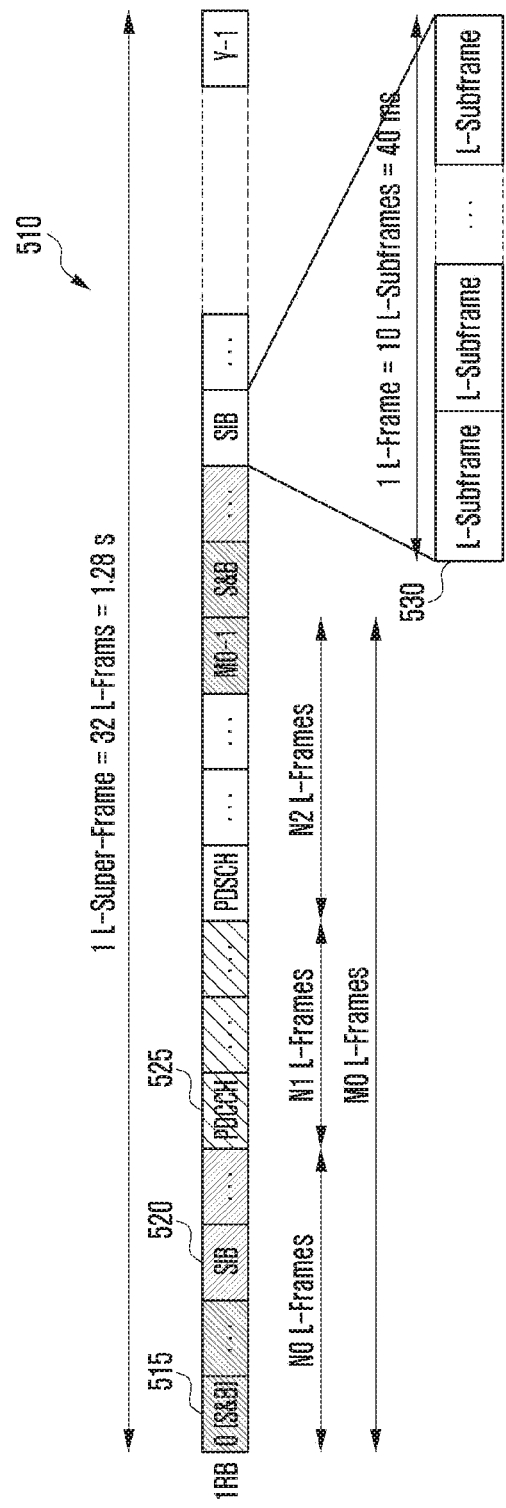
FIG. 5 is a diagram illustrating a signal transmission scenario in an IoT communication system.

FIG. 5 is a diagram illustrating a signal transmission scenario in an IoT communication system.

Referring to FIG. 5, an example of an IoT downlink time-domain structure is illustrated. Respective channels are arranged in a TDM method. Synchronization signals and broadcasting information (master information block (MIB)) may be transmitted together at a start portion 510 of the L-superframe. As described above, one L frame may include 10 L subframes 530. In general, a synchronization sequence may include a primary synchronization sequence (PSS) and a secondary synchronization sequence (SSS). In an embodiment, the PSS may be mentioned as a primary synchronization signal, and the SSS may be mentioned as a secondary synchronization signal. The MIB may include a limited amount of information of the system information. The remaining system information may be transmitted to a system information block (SIB). According to a coverage requirement condition, MIB and SIB frames may be repeatedly transmitted.

Figure 6:
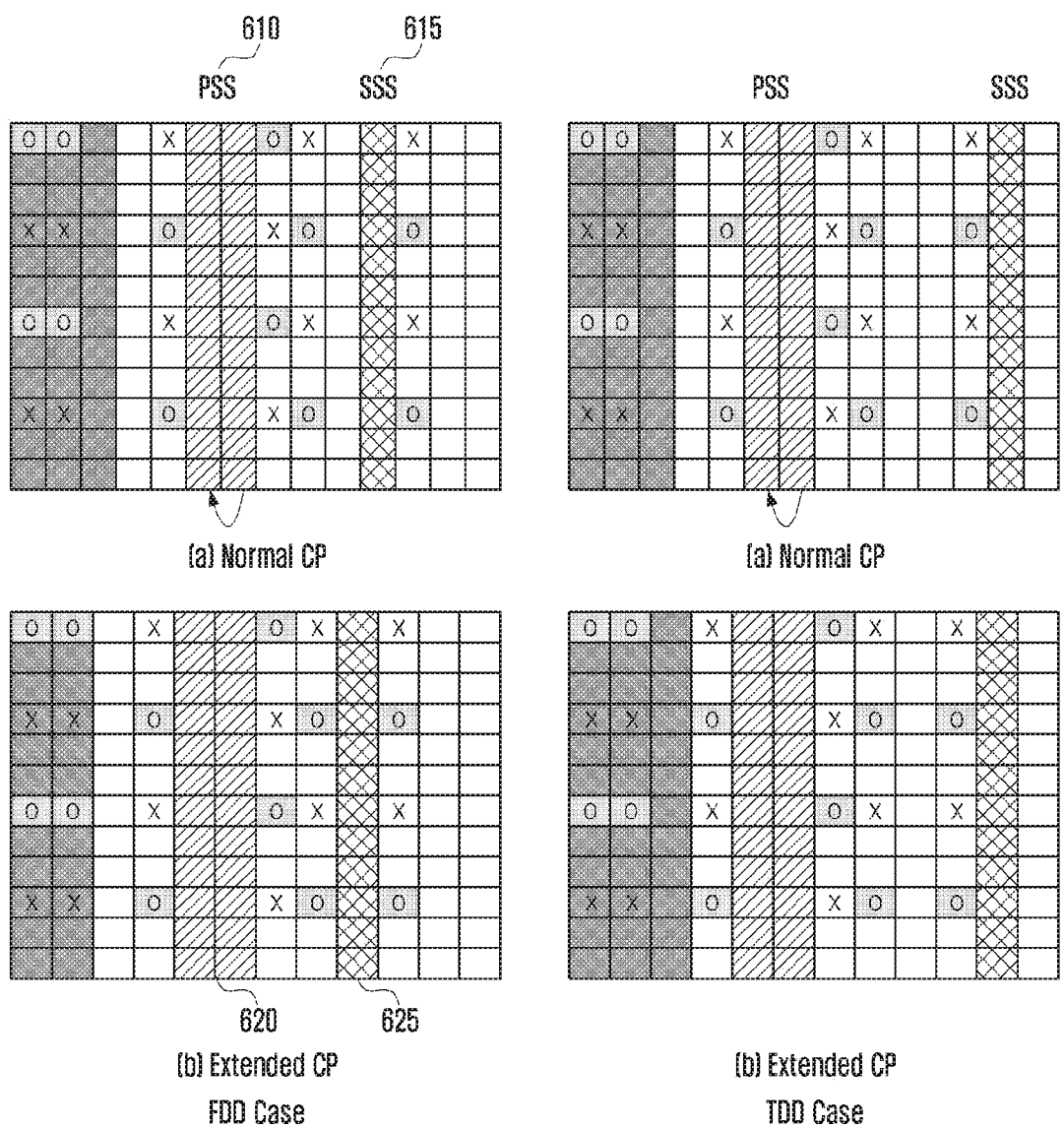
FIG. 6 is a diagram illustrating a synchronization signal transmission resource in an IoT communication system.

FIG. 6 is a diagram illustrating a synchronization signal transmission resource in an IoT communication system.

Referring to FIG. 6, an example of transmission of PSSs 610 and 620/SSSs 615 and 625 is illustrated. Since one PRB is used for IoT-related transmission, PSSs and/or SSSs may be repeatedly transmitted in a single subframe to improve the detection performance. In the same manner as in the LTE system, the IoT device may acquire partial basic system information through detection of the PSS/SSS, for example, frame timing, CP length (normal CP or extended CP), FDD mode or TDD mode, and cell ID. By arranging the PSS and SSS in different symbols in a subframe, successive PSS/SSS detection may be guided in accordance with the CP length and the FDD/TDD mode. In the case of an IoT in-band mode, when the PSS/SSS are transmitted, it is necessary that CRS transmission and PDCCH transmission related to LTE transmission are used. By arranging two successive symbols for the PSS transmission, the detection performance can be improved.

FIG. 7 is a diagram illustrating an example of a method for transmitting a primary synchronization signal (PSS) in an IoT communication system.

Referring to FIG. 7, as indicated as option 1, PSSs 710 and 720 may be transmitted from two resources discriminated by CPs 705 and 715, and as indicated as option 2, two PSSs 735 and 740 may be successively transmitted after one CP 730. In this case, a portion of the first PSS 745 may be used as a virtual CP 745. In other words, since the PSS signals are directly repeated, signal portion "A" 745 may be considered as a virtual CP for the next PSS symbol. In this case, the PSS may be detected regardless of what CP length is used. Further, symbol level correlation can be used, and thus the PSS detection complexity can be reduced on the receiver side.

Further, since the PSS/SSS may not use all symbols in a subframe, the PBCH (MIB and/or SIB) and the PSS/SSS may be transmitted in the same subframe. Further, the PSS/SSS signal may be used for channel estimation in order to decode the PBCH.

Figure 8:
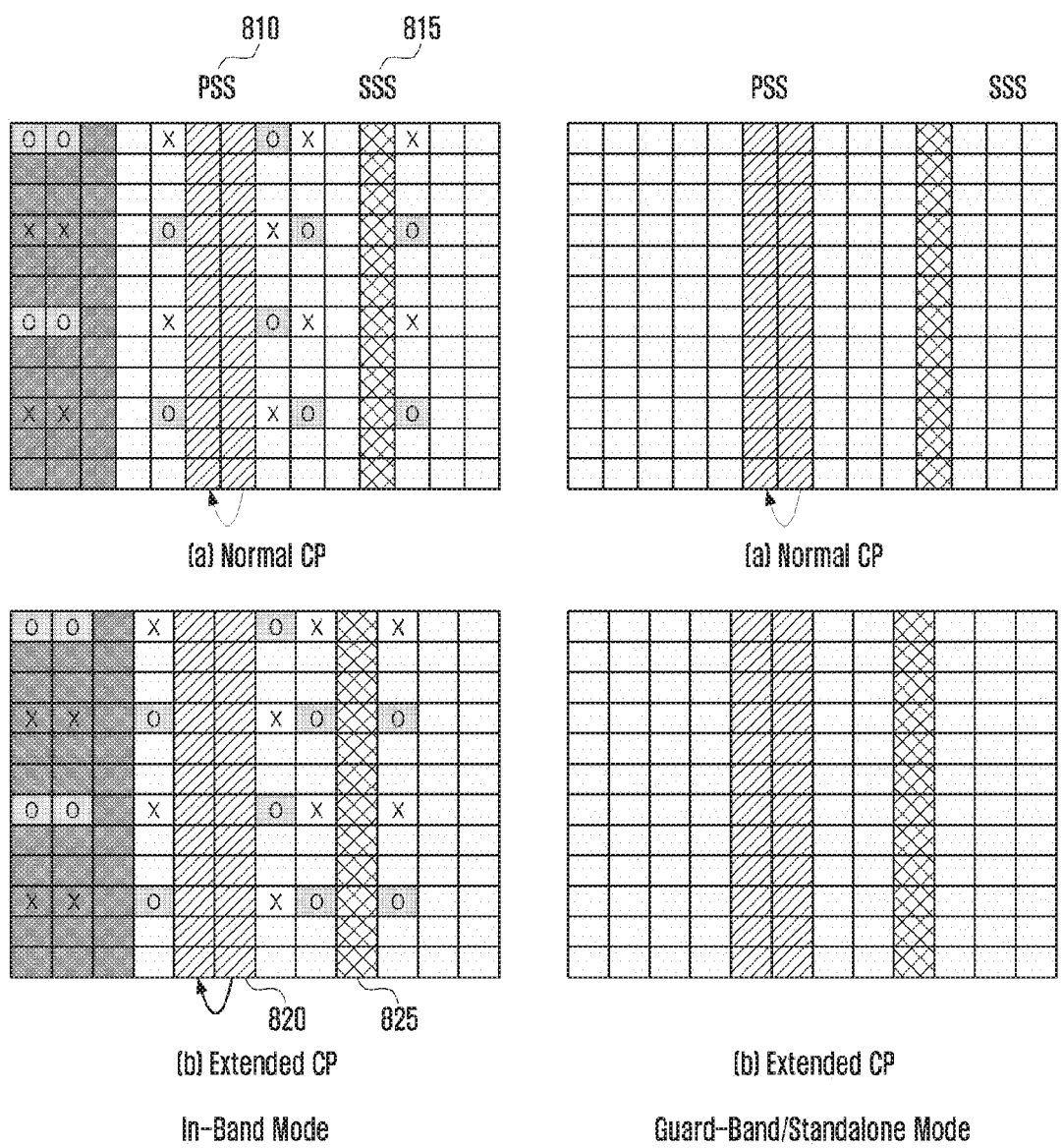
FIG. 8 is a diagram illustrating an example of a method for transmitting a physical broadcast channel (PBCH) in an IoT communication system.

FIG. 8 is a diagram illustrating an example of a method for transmitting a physical broadcast channel (PBCH) in an IoT communication system.

Referring to FIG. 8, in the case of an in-band mode, remaining resource elements in subframes that are not occupied by PSSs 810 and 820/SSSs 815 and 825 may be used for PBCH transmission. CRS resource elements should not be used for PBCH resource element mapping. In the case of a guard-band or standalone mode, the remaining elements excluding the PSS/SSS symbols may be used for the PBCH.

In the case of an IoT in-band mode, the IoT system and the LTE system may share transmission power of a base station during downlink transmission. Power boosting of specific signals or channels, for example, power boosting of PSS/SSS, MIB, SIB, or PDCCH, may be considered to improve the coverage performance of the in-band IoT system.

Further, it is also possible to design IoT PSS/SSS and MIB transmission in consideration of a method for avoiding collisions with the existing LTE PSS/SSS and MIB transmissions as many as possible.

Figure 9:
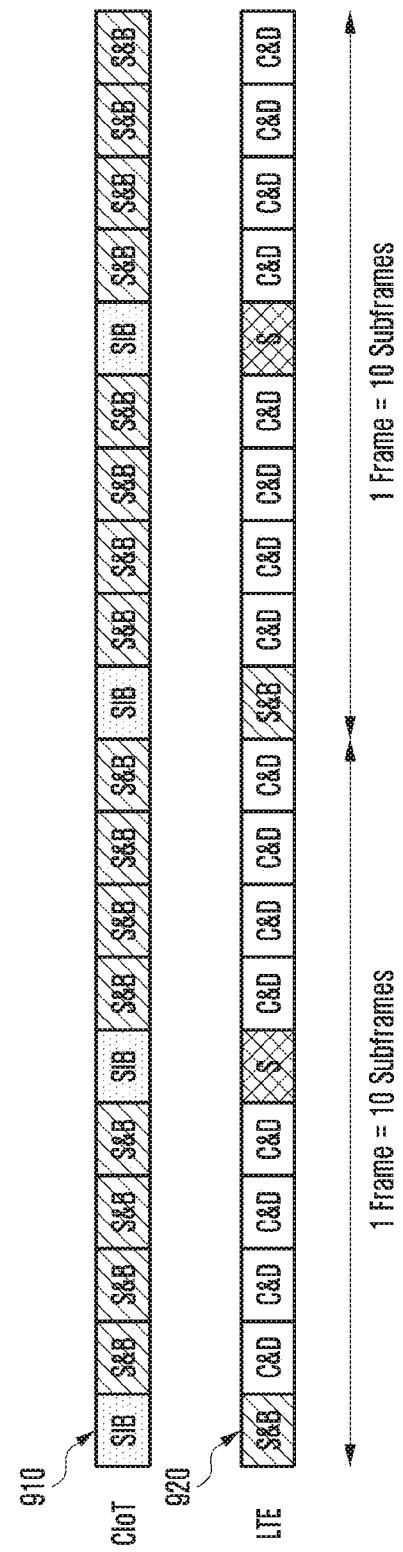
FIG. 9 is a diagram illustrating an example of a method for transmitting a PSS, a secondary synchronization signal (SSS), and a master information block (MIB) in an IoT communication system.

FIG. 9 is a diagram illustrating an example of a method for transmitting a PSS, a secondary synchronization signal (SSS), and a master information block (MIB) in an IoT communication system.

Referring to FIG. 9, an IoT transmission frame 910 and an LTE transmission frame 920 are illustrated. IoT PSS/SSS and MIB subframes and SIB subframes may be distributed in a proper method in order to avoid collisions in a time domain. As an alternative, PSS/SSS/MIB may be attempted to avoid collisions with LTE/PSS/SSS/MIB symbols as many as possible. For example, the PSS/SSS may be located at the last symbol of the subframe that is different from that in the LTE system.

Figure 10:
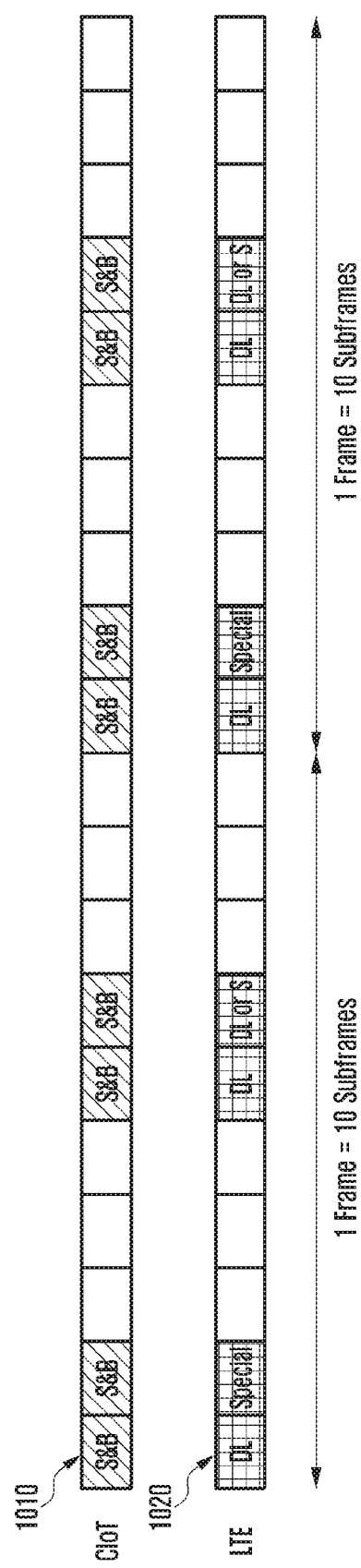
FIG. 10 is a diagram illustrating an example of a method for transmitting a PSS, SSS, and MIB in an IoT communication system operating time division duplex (TDD)

FIG. 10 is a diagram illustrating an example of a method for transmitting PSS, SSS, and MIB in an IoT communication system operating time division duplex (TDD).

Referring to FIG. 10, an IoT transmission frame 1010 and an LTE transmission frame 1020 are illustrated. In the case of LTE TDD, IoT PSS/SSS and MIB may be transmitted only in LTE DL subframes or specific frames. After acquisition of the system access and TDD UL/DL configurations, the use of other frames may be further acquired. The IoT PDCCH and PDSCH may occupy only DL subframes in the LTE TDD case.

Further, an IoT downlink frame structure may be proposed. This structure is aligned with the LTE system to become more suitable to an in-band deployment. In consideration of the in-band deployment, one primary purpose is to avoid an influence exerted on the existing LTE terminals, and thus it is necessary that certain REs are protected by the LTE and are not to be used. More specifically, in the case of resources including information that should be essentially transmitted or received for the LTE terminals, they may not be used to transmit IoT terminal signals.

Accordingly, with respect to the PSS/SSS and PBCH for the IoT terminal, it is necessary to allocate them to the resources that do not collide with the existing LTE signals. The deployment of PSS, SSS, and M-PBCH may be selected to avoid collisions with LTE CRS, PRS, PSS, SSS, PDCCH, PCFICH, PHICH, and MBSFN. For example, as for the LTE subframes, the MBSFN may be generated in subframes 1, 2, 3, 6, 7, and 8. Accordingly, in subframes 0, 4, 5, and 9, deployment of PSS/SSS and PBCH for the IoT terminal may be considered.

Figure 11:
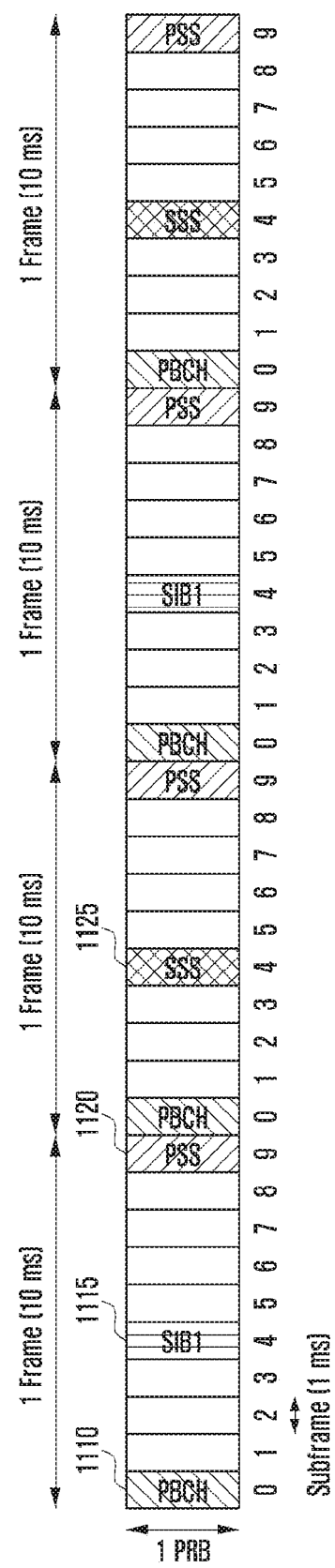
FIG. 11 is a diagram illustrating an example of one configuration of a downlink frame in an IoT communication system.

FIG. 11 is a diagram illustrating an example of one configuration of a downlink frame in an IoT communication system.

Referring to FIG. 11, a structure in which PBCH 1110, SIB1 1115, PSS 1120, and SSS 1125 are transmitted for the IoT terminal. In an embodiment, the frame structure in accordance with signal transmission and reception for the IoT terminal may be applied in a similar manner to that in the LTE system. In order to avoid potential collision with the MBSFN, the PSS 1120 may be transmitted on subframe 9, and may be repeatedly transmitted every 20 ms. Further, the PBCH 1110 may be transmitted on subframe 9, and may be repeatedly transmitted every 10 ms. If there is a dedicated resource for transmission of the SIB1 1115, it may be deployed in subframe 4 that is not occupied by the SSS. In the case of the above-described configuration, as a service method together with the MBSFN transmission of the LTE system, another deployment is also possible in consideration of the rule for avoiding collision with the existing LTE. Further, the resources remaining after the transmission may be shared for the PDCCH and PDS CH transmission.

Hereinafter, a method for providing LTE system related information for signal transmission/reception of the IoT terminal will be described. With respect to LTE in-band IoT systems, partial system information or configurations of the LTE system may be necessary to support more preferable coexistence between the LTE and the IoT. For example, if partial resources in the PRB of the IoT system are occupied by transmission of LTE system related information, the IoT system may transmit or receive a signal using the resource for transmission of the LTE system related information and information transmitted on the resource. Further, it is necessary that the IoT system performs signal transmission/reception to avoid partial resources among resources occupied by the LTE terminal.

As information being transmitted for the LTE terminal as described above, there may be a CRS. In the LTE system, the CRS may be transmitted from partial REs in the whole bandwidth for channel estimation and RSRP measurement. The CRS of the LTE system may be transmitted even from the PRB in an in-band IoT operation mode.

In this case, the IoT system can perform more reliable signal transmission/reception using the LTE CRS transmitted on the PRB allocated for the IoT system for the channel estimation. The locations of resource elements for CRS transmission in the frequency domain may be determined by an LTE cell ID. Further, cell-specific frequency shift may be determined based on $v_{shift}=N_{ID}^{LTE,cell}$ mod 6. The transmitted CRS symbols may be determined based on at least one of a cell ID, slot index, CP length, and BW (e.g., $N_{RB}^{DL}$). Further, the CRS transmission may be related to the number of antenna ports for the CRS transmission, that is, only antenna port 0, antenna ports 0 and 1, or antenna ports 0, 1, 2, and 3. Further, in the LTE system bandwidth, an actual PRB index may be guided based on a PRB offset as a center frequency and bandwidth. Further, in an embodiment, the PRB index may be explicitly indicated. If a part or the whole of information related to the LTE CRS transmission is transmitted to a terminal related to the IoT system, the IoT terminal may receive the LTE CRS, and may perform channel estimation based on this.

After parameters related to the LTE CRS transmission are explicitly or implicitly signaled in the IoT system, the IoT devices may use the LTE CRS for downlink channel estimation. Basically, the CP length may be determined in an IoT PSS/SSS detection process. The remaining parameters may be transferred in synchronization signals, MIB, or SIB. As an example, in the MIB of the IoT system, one-bit indication indicating whether the current IoT cell ID is the same as the LTE cell ID may be transmitted to the IoT terminal.

Hereinafter, options for transmitting parameters including LTE CRS-related information to the IoT terminal will be discussed.

Option 1: All parameters may be signaled through synchronization signals and MIB. If the LTE CRS-related parameters are transmitted through the synchronization signals and MIB as described above, the IoT terminal may use the LTE CRS for channel estimation from the time when decoding the SIB. Also, the LTE cell ID may be guided, for example, through an IoT synchronization process in which the same cell ID is used in the IoT system. The remaining parameters, that is, the BW $N_{RB}^{DL}$ and the CRS antenna port may be transmitted through MIBfmf. In the same manner as the LTE MIB, three bits may be used for BW indication.

Further, in some cases, in the case of the IoT terminal, it may be assumed that the number of IoT CRS antenna ports is equal to the number of LTE CRS antenna ports. However, the numbers of antenna ports used by the LTE CRS and the IoT CRS may be partially different from each other. For example, maximally four antenna ports are used for the LTE CRS transmission, whereas maximally two antenna ports are used for the IoT CRS transmission. Even if the IoT terminals detect the use of two antenna ports related to the CRS reception in the PBCH decoding process, it is necessary to know the actual number of antenna ports and to consider this in a resource mapping process. Accordingly, through separate signaling, it is necessary to transmit information related to the number of antenna ports for the LTE CRS transmission to the IoT terminal. More specifically, the number of antenna ports (e.g., 1, 2, or 4) related to the LTE CRS may be indicated through separate 2-bit signaling.

Further, as an alternative of the above-described method, a one-bit indicator indicating whether the number of antenna ports related to the LTE CRS transmission is 4 or whether the number of antenna ports related to the LTE CRS transmission is equal to the number of IoT-related antenna ports may be transmitted to the terminal. More specifically, one bit may be used to indicate whether the number of antenna ports related to the LTE CRS transmission is 4, or may be used to indicate whether the number of IoT antenna ports is equal to the number of LTE antenna ports.

Option 2: If the LTE-related cell ID cannot be indicated by the PSS/SSS of the IoT, information on the LTE-related cell ID may be included in the MIB. This means that the 9-bit cell ID and 3-bit BW are indicated by the MIB.

Option 3: The IoT PSS/SSS may indicate partial information of the LTE cell ID, and the remaining information may be additionally indicated by the MIB. For example, the LTE cell SSS index may be indicated in the IoT PSS/SSS, and the LTE cell PSS index may be indicated in the MIB. Accordingly, the LTE cell ID may be guided by the IoT terminal after the IoT PSS/SSS and the MIB are received. As another example, the IoT cell ID may be set to $N_{ID}^{CIoT,cell}=N_{ID}^{LTE,cell}$ mod 168. In this case, additional information, that is, $$\frac{N_{ID}^{LTE,cell}}{168},$$

may be indicated in the MIB. This mapping rule provides a cell-specific CRS frequency shift $v_{shift}$ that is equal to that in the case of the LTE cell ID, in which it is profitable that the IoT cell ID notifies the IoT devices of at least CRS locations. In addition, partial information related to the LTE cell ID is signaled in the IoT terminal, and the remaining information may be determined by a predetermined relation or an equation.

Option 4: In order to reduce a payload size of the MIB, for example, partial parameters, such as LTE-related cell ID and/or BW and/or CRS antenna ports, may be transmitted through the SIB. In this case, in the IoT system, the LTE CRS is unable to be used for channel estimation in an SIB decoding process. However, from the time when the IoT terminal decodes the PDCCH after the SIB decoding, the LTE CRS may be used for the channel estimation in the IoT system.

Figure 12:
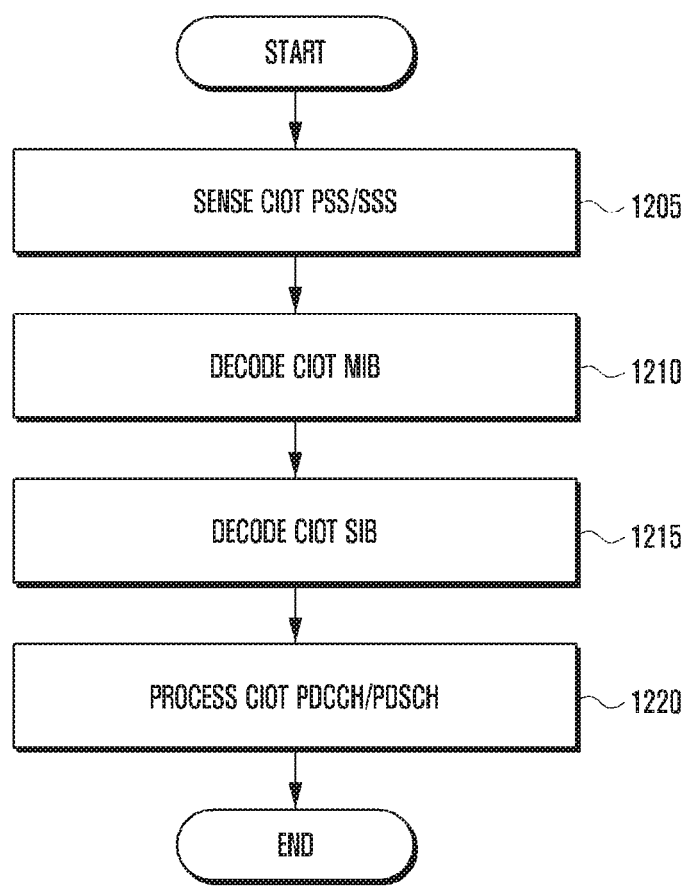
FIG. 12 is a diagram illustrating an example of a method for an IoT terminal to receive a signal.

FIG. 12 is a diagram illustrating an example of a method for an IoT terminal to receive a signal.

Referring to FIG. 12, a method for an IoT terminal to receive a signal from a base station will be described.

At operation 1205, the IoT terminal may sense at least one of IoT-related PSS/SSS. In an embodiment, the PSS/SSS may acquire LTE-related cell ID information through the synchronization signals.

At operation 1210, the IoT terminal may decode IoT-related MIB. In the above-described options, LTE CRS-related information that is transmitted through the MIB may be acquired in accordance with the MIB decoding.

At operation 1215, the IoT terminal may decode IoT-related SIB. In an embodiment, if the LTE CRS-related information is received at the previous operation, the IoT terminal may use the LTE CRS during SIB decoding. Further, the IoT terminal may acquire the LTE CRS-related information included in the SIB in accordance with the options.

At operation 1220, the IoT terminal may receive and process at least one of IoT-related PDCCH/PDSCH. In the above-described process, the IoT terminal may receive and process one or more PDCCH/PDSCH based on the LTE CRS-related information received at the previous operation.

Figure 13:
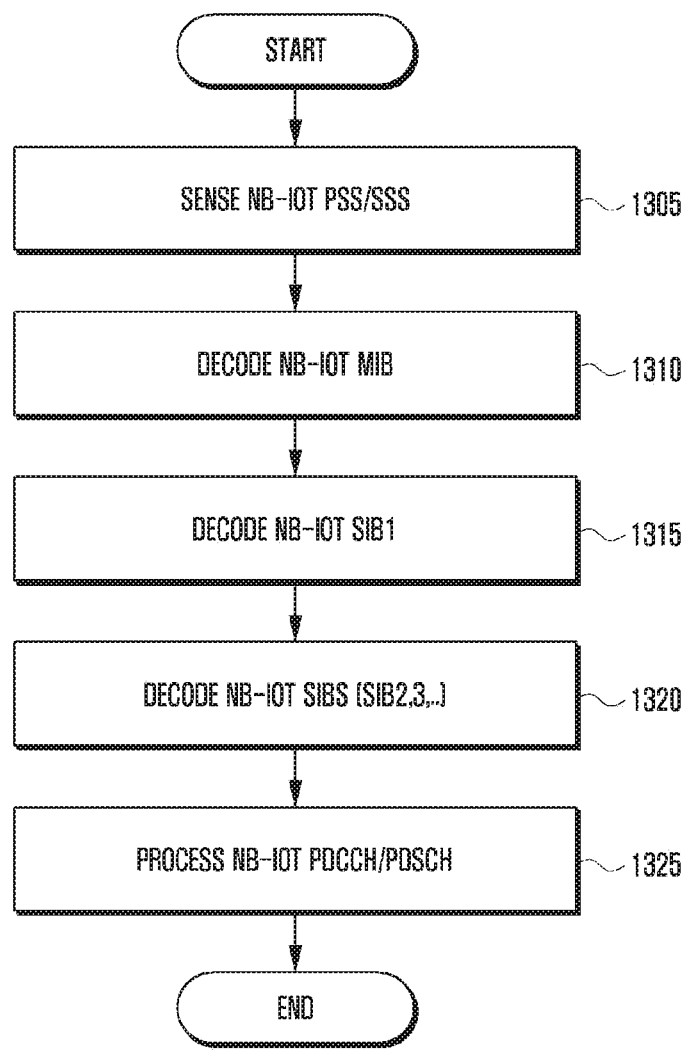
FIG. 13 is a diagram illustrating another example of a method for an IoT device to receive a signal.

FIG. 13 is a diagram illustrating another example of a method for an IoT terminal to receive a signal.

Referring to FIG. 13, another method for an IoT terminal to receive a signal from a base station will be described.

At operation 1305, the IoT terminal may sense at least one of IoT-related PSS/SSS. In an embodiment, the PSS/SSS may acquire LTE-related cell ID information through the synchronization signals. Further, in an embodiment, the IoT terminal may acquire LTE CRS-related resource allocation information or location information.

At operation 1310, the IoT terminal may decode IoT-related MIB. In the above-described options, LTE CRS-related information that is transmitted through the MIB may be acquired in accordance with the MIB decoding. Through this, the IoT terminal may acquire information on LTE CRS-related CRS values and the number of antenna ports.

At operation 1315, the IoT terminal may decode IoT-related SIB1. The SIB1 may be an SIB set for the IoT terminal, and may include information, such as LTE CRS information. Through this, the IoT terminal may acquire LTE CRS-related information that has not been received at the previous operation. In the case of transmitting the LTE CRS information through the SIB1 as described above, the IoT terminal may not use the LTE CRS information only during SIB1 decoding, but may acquire the LTE CRS information during decoding of other SIBs.

At operation 1320, the IoT terminal may decode the IoT-related SIB. The SIB may be shared with the LTE terminal, and during the SIB decoding, the LTE CRS-related information acquired at the previous operation may be used.

At operation 1325, the IoT terminal may receive and process at least one of IoT-related PDCCH/PDSCH. In the above-described process, the IoT terminal may receive and process one or more PDCCH/PDSCH based on the LTE CRS-related information received at the previous operation.

In an embodiment, the IoT terminal may obtain LTE CRS information at the respective operations. CRS-related information amount acquired at the respective operations may differ in accordance with design options. In this case, acquired CRS information may be additionally used at the next operation. Further, in an embodiment, a different CRS information amount may be acquired at a different operation. For example, after the terminal acquires LTE CRS-related offset information, locations of resource elements occupied by the CRS may be guided. The base station may transmit IoT-related signal through non-CRS resource elements, and devices may also know that the non-CRS resource elements are merely processed (i.e., both a transmitter and a receiver are implicitly aligned to avoid transmission/reception of signals through the non-CRS resource elements). If the CRS information is sufficiently obtained, the CRS signals may be used for channel estimation in the process of decoding the PDCCH and PDSCH.

Hereinafter, methods for signaling PRB index information used for IoT transmission will be described.

Candidate PRBs for in-band IoT operation may be pre-defined based on a certain system requirement. An example is described in Table 1, and it may be considered that in order for the IoT terminals to easily find IoT signals at an initial cell searching, an offset between PRB center frequencies and 100 kHz channel raster offset are very small. More specifically, PRB candidate indexes for transmitting IoT PSS and SS in accordance with respective frequency bands are disclosed in Table 1. More specifically, Table 1 discloses indexes of candidate IoT PRBs for an in-band operation.

TABLE 1

| | LTE BW (# RBs) | | | | |
|---|---|---|---|---|---|
| | 3 MHz (15) | 5 MHz (25) | 10 MHz (50) | 15 MHz (75) | 20 MHz (100) |
| In-band PRB index for NB-PSS/NB-SSS transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

The IoT PRB locations as described above may be used to derive sequence values used for CRS transmission. More specifically, the LTE CRS may use different sequence values in accordance with PRB indexes being transmitted, and if the terminal acquires such PRB information, it can know the sequence value used for the CRS transmission. As described above, the PRB location is required for the terminal to derive the CRS sequence values. The PRB index may be explicitly or implicitly indicated in NB-MIB.

Option 1: In Table 1, 46 candidate PRBs exist in total. Accordingly, 6 bits may be used to indicate 64 candidates that may include the following cases:

In the case of 46 candidates for in-band operation mode (as indicated in Table 1)

Through separate signaling as described above, related PRB information among 46 candidate PRBs may be transmitted to the terminal.

Option 2: LTE CRS sequence values in a certain PRB are actually related to an offset to the center frequency. In relation to this, the details thereof will be described later.

In an embodiment, even in the case of using different bandwidths, the same CRS sequence value may be used for PRBs having the same offset. Accordingly, even in the case of different PRB candidate groups having different frequency bands, the same CRS may be used if they have the same offset value. If the PRBs share the same offset for the center frequency, the same CRS sequence values may be used independent of BW. In the case of 15 MHz BW, the PRB offset includes all cases of the BW having odd-numbered PRBs, that is, all cases of 5 MHz and 15 MHz. In the case of 20 MHz BW, the PRB offset includes all cases of the BW having even-numbered PRBs, that is, all cases of 10 MHz and BW. There are total 32 offsets including 18 offsets for the BW having even-numbered PRBs and 14 offsets for the BW having odd-numbered PRBs. As described above, if information related to the IoT PRB indexes is transmitted as offset values in the center frequency, it may be displayed as the same offset value even in the case of different indexes, and the PRB candidates having the same offset may use the same CRS sequence. Accordingly, only 5 bits can be used to indicate RPB offsets related to the center frequency:

BW having even-numbered PRBs: Up to 18 offsets at maximum

BW having odd-numbered PRBs: Up to 14 offsets at maximum

As described above, the PRB indexes may be indicated through 30 pieces of offset information in total, and thus the PRB indexes can be indicated as information of 5 bits in total. Further, in an embodiment, in the case of the center frequency, related information can be acquired when the synchronization signal is received.

Actually, as enumerated in Table 2, the offsets may be mapped onto CRS sequence indexes. Table 2 is a table indicating indexes of IoT PRB candidates for the in-band operation.

The respective bandwidths are aligned on the center frequency 1405, and parts of IoT PRB indexes on respective carriers are illustrated. In the case of BW of 3 MHz, the PRB indexes may be 2(1412) and 12(1410). In this case, if the respective PRB indexes are indicated by offset values 1414 and 1416 that are apart from the center frequency, 12 of 3 MHz 1410 has the same offset value 1416 as that of 17 of 5 MHz 1420 and 42 of 15 MHz 1430. In this case, the respective PRB indexes use CRS sequences, and through transmission of the offset information to the terminal, the terminal may acquire CRS sequence information. In addition, if the respective PRB indexes are apart from the center frequency for the same offset, the CRS sequences corresponding to the PRB indexes are the same, and thus the base station can transmit the CRS sequence information to the terminal through a smaller number of information bits.

Further, in an embodiment, the MIB may include contents related to the following CRS. More specifically, the LTE CRS-related information may be transmitted to the terminal through the MIB.

1) CRS index information: This is necessary for in-band deployment to make the IoT reuse the LTE CRS. The CRS location information may be acquired through a cell search, and more specifically, the CRS location information may be acquired during cell synchronization acquisition. Further, in an embodiment, the center frequency information may be acquired through the cell search. However, the terminal is unable to acquire the CRS-related sequence value only through the cell search.

2) LTE (CRS) antenna port information: This is necessary for in-band deployment to notify the IoT terminals of

TABLE 2

| | LTE BW (# RBs) | | | | |
|---|---|---|---|---|---|
| | 3 MHz (15) | 5 MHz (25) | 10 MHz (50) | 15 MHz (75) | 20 MHz (100) |
| In-band PRB Indices for NB-PSS/NB-SSS Transmission (n_PRB) | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |
| CRS Index m | | | 2*n_PRB, 2*n_PRB + 1 | | |
| CRS Index m' | | | m' = m + $N_{RB}^{max, DL} - N_{RB}^{DL}$ | | |
| | (99, 100), (119, 120) | (89, 90), (99, 100), (119, 120), (129, 130) | (68, 69), (78, 79), (88, 89), (98, 99), (120, 121), (130, 131), (140, 141), (150, 151) | (39, 40), (49, 50), (59, 60), (69, 70), (79, 80), (89, 90), (99, 100), (119, 120), (129, 130), (139, 140), (149, 150), (159, 160), (169, 170), (179, 180) | (18, 19), (28, 29), (38, 39), (48, 49), (58, 59), (68, 69), (78, 79), (88, 89), (98, 99), (120, 121), (130, 131), (140, 141), (150, 151), (160, 161), (170, 171), (180, 181), (190, 191), (200, 201) |

Figure 14:
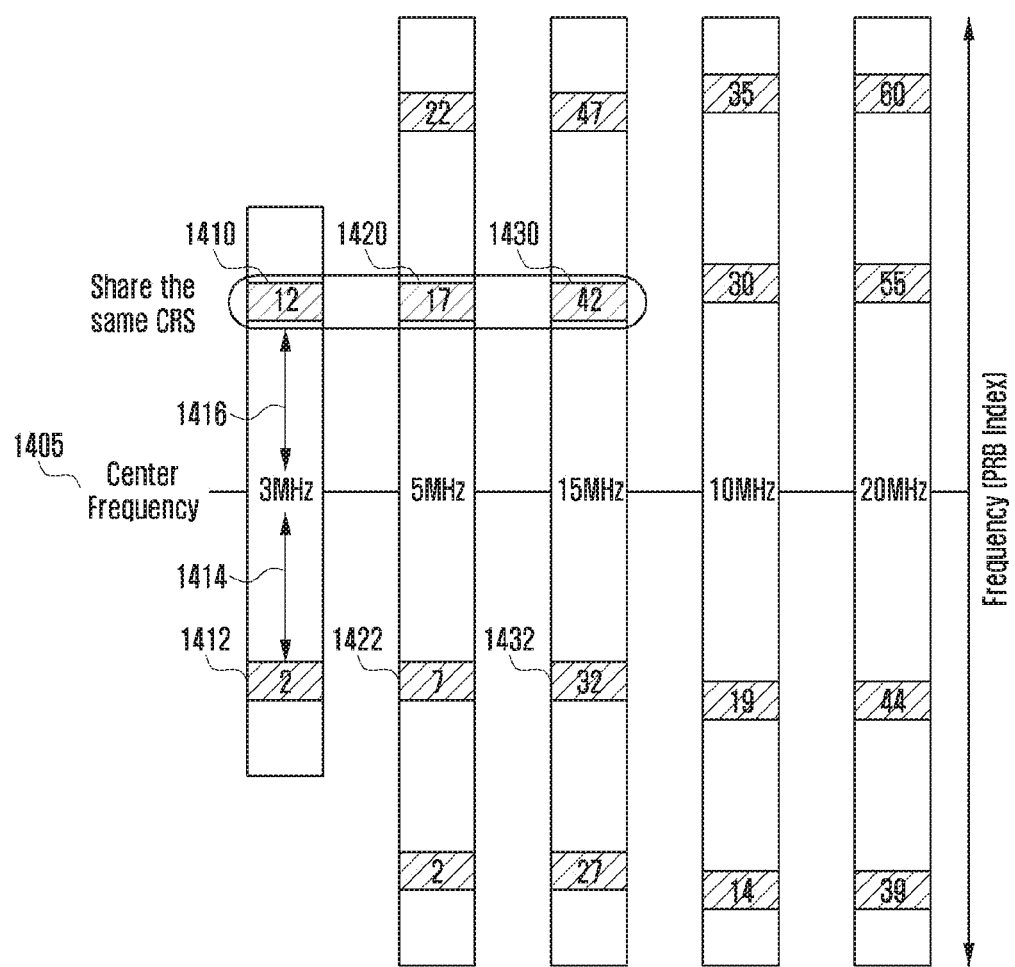
FIG. 14 is a diagram illustrating PRB candidate resources to transmit IoT-related information in a communication system.

FIG. 14 is a diagram illustrating PRB candidate resources to transmit IoT-related information in a communication system.

Referring to FIG. 14, carriers having bandwidths of 3 MHz, 5 MHz, 15 MHz, 10 MHz, and 20 MHz are illustrated.

the number of antenna ports used by the LTE CRS. Since the antenna ports used for the LTE and IoT may differ from each other, this information is required. For example, although four antenna ports are used in the LTE, only two antenna ports are maximally used for the IoT. Even if the IoT terminals detect the use of two antenna ports in the PBCH decoding process, it is necessary to know the actual number of antenna ports used for the LTE CRS transmission and to consider this in a resource mapping process. Two bits may be used to indicate the number of antenna ports in the LTE, for example, to indicate 1, 2, or 4. As an alternative, one bit may be used to indicate whether the number of antenna ports is 4, or to indicate whether the number of IoT antenna ports is equal to the number of LTE antenna ports.

As described above, in an embodiment, in the case of in-band IoT, the LTE CRS may be simultaneously transmitted to the RB in which the IoT operates, and the terminal may receive the LTE CRS-related information, and based on this, the terminal may use the LTE CRS for channel estimation or RRM measurement. More specifically, in order for the terminal to use the LTE CRS for the channel estimation, transmission power information of the LTE CRS is required. The transmission power information may be received through methods as follows.

i) Indication of a power ratio between the LTE CRS and the PDSCH transmission RE and a power ratio between the IoT RS and the PDSCH transmission RE in the IoT transmission RB ii) Indication of the difference between one of the two power ratio types described in i) and the two power ratio types described in i)

iii) Indication of one of the two power retio types described in i) and an absolute power offset value between the IoT RS and the LTE CRS As described above, information on the relationship between the transmission power of the IoT-related RS and the transmission power of the LTE-related CRS may be transmitted from the base station to the terminal, and more specifically, the base station may transmit the offset value between the two transmission powers to the terminal.

In the case of performing i), ii), and iii), the corresponding information may be carried on the MIB or SIB to be transmitted through the PBCH, and may be notified through the PDSCH. As the above-described indications, i), ii), and iii) may transmit two types of information (e.g., in the case of selecting i), the base station should indicate two types of power ratios to the terminal), and the two types of information may be transmitted through a different channel (e.g., MIB or SIB) or through different channels. The terminal that has received this may perform channel estimation based on at least one of the transmission power offset value and the IoT-related RS transmission power information.

Further, in the LTE system, partial resources and signals transmitted in the IoT PRB, for example, MBSFN, PRS, CSI-RS, and SRS, may be affected in accordance with the IoT transmission, or should not be interfered. Accordingly, resource-related configurations should be indicated in the IoT SIB. In the case of MBSFN, MCCH repetition period (32, 64, 128, or 256 frames) and MCCH offset (0 to 10) may be indicated in the SIB. In the case of PRS, the PRS bandwidth $N_{RB}^{PRS}$, PRS configuration index $I_{PRS}$, and the number of successive downlink subframes $N_{PRS}$ may be indicated in the case where the IoT PRB is used for the LTE PRS transmission.

The system information required in the LTE system may be included in a specific system information block type N (SIB-N) in the IoT system that is the SIB type in which N is predefined for the LTE system information. If type-specific SIB change indication exists in the MIB, the IoT may update the SIB-N only in the case where the LTE-related system information is changed. As described above, in the in-band IoT mode, the LTE system-related information may be signaled in the IoT terminal, and the signaling period of such a signal may be notified by the base station.

Figure 15:
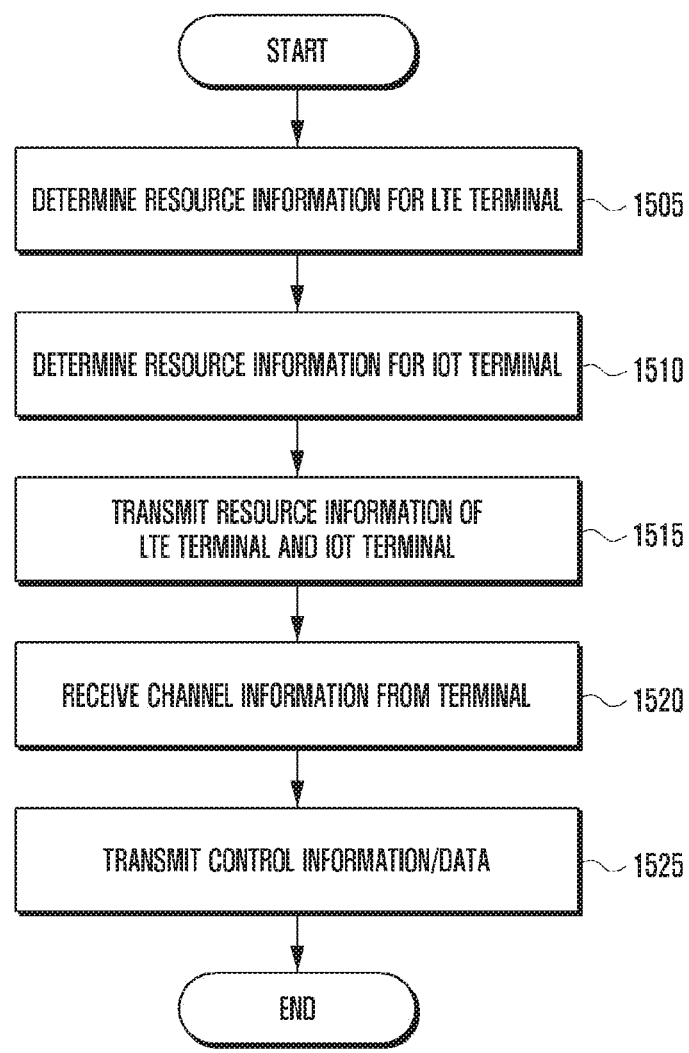
FIG. 15 is a diagram illustrating an example of a method for a base station to transmit IoT-related information.

FIG. 15 is a diagram illustrating an example of a method for a base station to transmit IoT-related information.

Referring to FIG. 15, the base station may transmit LTE-related information and IoT-related information to the terminal.

At operation 1505, the base station may determine resource information related to the LTE communication system. More specifically, the LTE system may determine resource allocation information for signal transmission/reception, and in this case, it may determine information on a resource region to be essentially transmitted to the terminal.

At operation 1510, the base station may determine resource information related to the IoT communication system. In an embodiment, on the assumption of an in-band IoT mode, in the case of determining the resource information related to the IoT communication system, the base station may allocate resources related to the IoT communication system to a region excluding the resource region allocated for the LTE communication system. Further, signal transmission resource related to the IoT communication system may be allocated to a region in which a signal, such as a CRS, can be used more easily in the LTE communication system. As described above, in the case of allocating the resource for transmission of information related to the IoT communication system, the base station may refer to at least one of a resource region already allocated for transmission of information related to the LTE communication system and a type of information transmitted from the corresponding resource.

At operation 1515, the base station may transmit at least one of the determined information to the terminal. The information may be transmitted through upper signaling or control signaling, and a part of the MIB may be transmitted through the SIB.

At operation 1520, the base station may receive channel information from the terminal. The channel information may include downlink channel information measured by the terminal, and channel information received from the IoT terminal may include channel information measured based on the CRS related to the LTE communication system.

At operation 1525, the base station may transmit control information and data information to the terminal based on at least one of the channel information and the information determined at the previous operation.

Further, in an embodiment, LTE SFN information may be required in the IoT system in order to guide the resource occupied by the LTE, for example, the CSI-RS. Since the LTE SFN and the IoT SFN may not be always aligned with each other, the cycle thereof may have a different scale. Accordingly, in the case where the LTE SFN and the IoT SFN have different settings as described above, it is necessary for the base station to perform scheduling of such information to the terminal.

Figure 16:
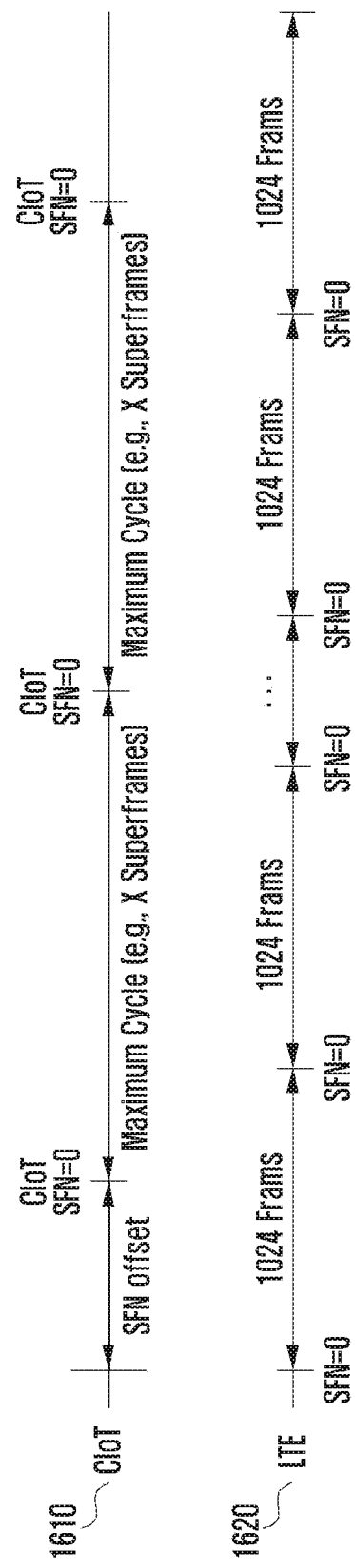
FIG. 16 is a diagram illustrating an example of a method for setting an SFN offset in an LTE system and an IoT system.

FIG. 16 is a diagram illustrating an example of a method for setting an SFN offset in an LTE system and an IoT system.

Referring to FIG. 16, information related to IoT SFN 1610 and information related to LTE SFN 1620 are illustrated. In an embodiment, it may be necessary for the IoT SIB to indicate the SFN offset, and this may be defined as a difference between IoT SFN 0 time and the last LTE SFN 0. Accordingly, it is necessary for the terminal to notify of the difference in time as described above, and in accordance with the minimum time unit of the time difference, the SFN offset may require a different bit amount for the indication.

Option 1: If an offset is always a multiple of 40 ms, the information may be indicated through 8-bit SFN offset information.

Option 2: In order to support a frame level difference of 10 ms, the information may be indicated through 10-bit SFN offset information.

Option 3: In order to support a subframe (1 ms) difference, 14-bit SFN offset is necessary.

Figure 17:
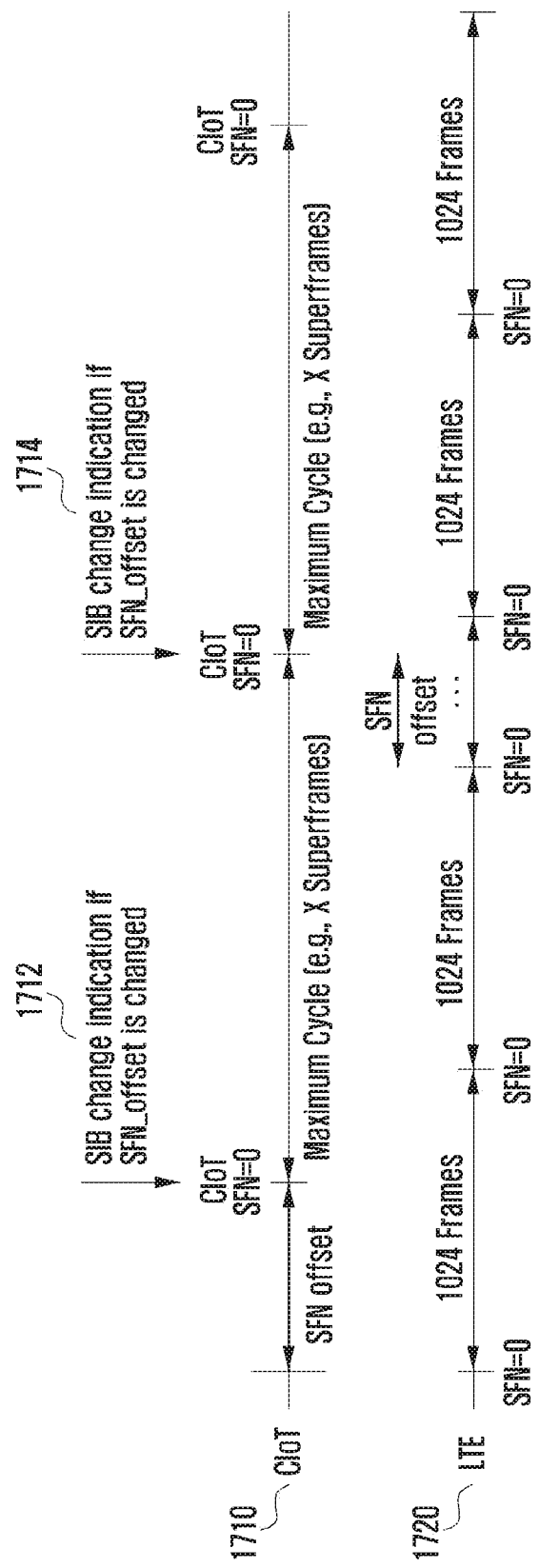
FIG. 17 is a diagram illustrating another example of a method for setting an SFN offset in an LTE system and an IoT system.

FIG. 17 is a diagram illustrating another example of a method for setting an SFN offset in an LTE system and an IoT system.

Referring to FIG. 17, information related to IoT SFN 1710 and information related to LTE SFN 1720 are illustrated.

If the maximum period of the IoT system is not integer times (i.e., 1024 frames) the maximum period in the LTE system, the SFN offset may be changed at starts (i.e., IoT SFN=0) 1712 and 1714 of the IoT period. In this case, the changed SFN offset may be signaled to the IoT device at starts (i.e., IoT SFN=0) 1712 and 1714 of the IoT period.

Further, in an embodiment, the PRB index for IoT uplink transmission should be indicated in the SIB. If an LTE cell has a plurality of PRBs for the IoT operation, the SIB in a certain IoT PRB may include different PRB indexes for not only in-band IoT but also guard-band IoT. The plurality of RPBs may independently operate, and the IoT system operates in a certain PRB for a downlink and in a certain PRB for an uplink. As an alternative, a single IoT system may have a plurality of PRBs for downlink or uplink. Inter-PRB hopping may be considered in this scenario to obtain additional merits of frequency diversity and scheduling flexibility.

The transmission power of signals to be used for measurement, for example, transmission power of synchronization signals and transmission power of a pilot or reference signal may be indicated in the SIB.

Figure 18:
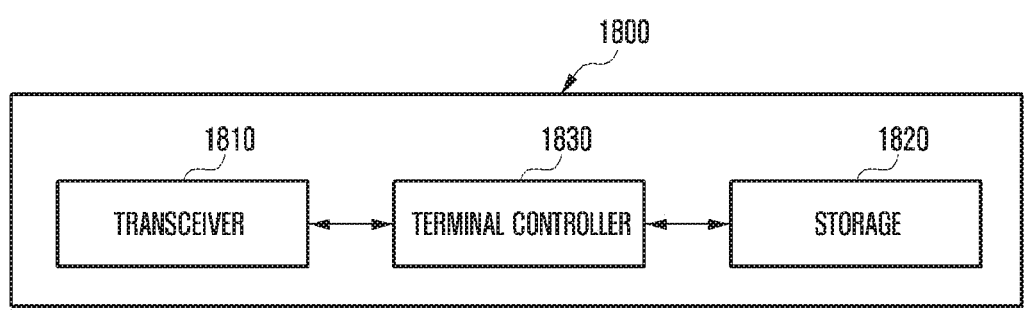
FIG. 18 is a diagram illustrating a terminal according to an embodiment of the present disclosure.

FIG. 18 is a diagram illustrating a terminal according to an embodiment of the present disclosure.

Referring to FIG. 18, a terminal 1800 according to an embodiment may include a transceiver 1810, a storage 1820, and a controller 1830.

The transceiver 1810 may transmit and receive information related to the terminal, and may transmit/receive a signal to/from a base station.

The storage 1820 may store therein at least one or a part of information related to the terminal and information transmitted/received through the transceiver 1810.

The controller 1830 may control the overall operation of the terminal. In an embodiment, the terminal may be an LTE terminal or an IoT terminal, and may be a terminal including features of the two terminals.

Figure 19:
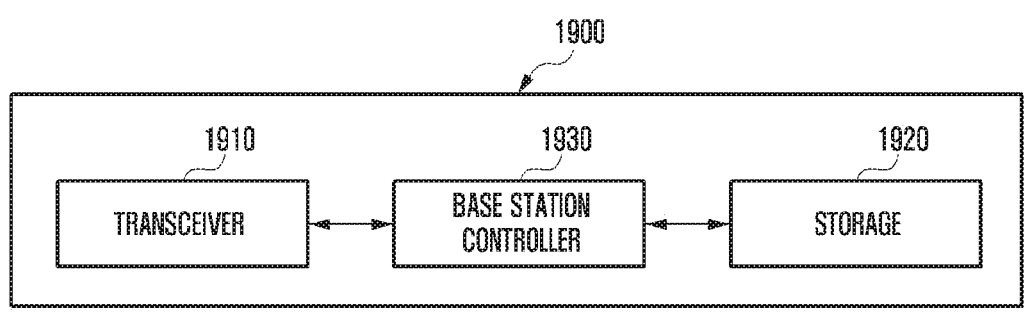
FIG. 19 is a diagram illustrating a base station according to an embodiment of the present disclosure.

FIG. 19 is a diagram illustrating a base station according to an embodiment of the present disclosure.

Referring to FIG. 19, a base station 1900 according to an embodiment may include a transceiver 1910, a storage 1920, and a controller 1930.

The transceiver 1910 may transmit and receive information related to the base station, and may transmit/receive a signal to/from a terminal.

The storage 1920 may store therein at least one or a part of information related to the base station and information transmitted/received through the transceiver 1910.

The controller 1930 may control the overall operation of the base station. In an embodiment, the base station may transmit/receive signals for at least one of an LTE terminal and an IoT terminal, and may determine information transmitted to another communication system based on information corresponding to a specific communication system.

The terminal may be an LTE terminal or an IoT terminal, and may be a terminal including features of the two terminals.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

The invention claimed is:

1. A method performed by a terminal for transmitting and receiving a signal using Narrowband Internet of Things (NB-IoT) in a mobile communication system, the method comprising:

receiving, from a base station, a master information block (MIB) for the NB-IoT, the MIB including at least one of first information on a sequence for a cell-specific reference signal and second information on a number of antenna ports for the cell-specific reference signal;

receiving, from the base station, a system information block (SIB) for the NB-IoT, the SIB including third information on a power offset for a reference signal of the NB-IoT; and receiving, from the base station, at least one of the cell-specific reference signal and the reference signal of the NB-IoT based on at least one of the first information, the second information and the third information, wherein a bandwidth used for the NB-IoT is less than or equal to 180 kHz, wherein a value of the first information corresponds to a physical resource block (PRB) index which is a frequency offset value from a center frequency, wherein the value of the first information identifies one of 14 frequency offset values for a bandwidth having odd numbered PRBs, and wherein the value of the first information identifies one of 18 frequency offset values for a bandwidth having even numbered PRBs.

2. The method of claim 1, wherein the second information indicates whether the number of antenna ports for the reference signal of the NB-IoT is either equal to a number of antenna ports for the cell-specific reference signal or to 4.

3. A method performed by a base station for transmitting and receiving a signal with a terminal using Narrowband Internet of Things (NB-IoT) in a mobile communication system, the method comprising:

transmitting, to a terminal, a master information block (MIB) for the NB-IoT, the MIB including at least one of first information on a sequence for a cell-specific reference signal and second information on a number of antenna ports for the cell-specific reference signal;

transmitting, to the terminal, a system information block (SIB) for the NB-IoT, the SIB including third information on a power offset for a reference signal of the NB-IoT; and transmitting, to the terminal, at least one of the cell-specific reference signal and the reference signal of the NB-IoT based on at least one of the first information, the second information and the third information, wherein a bandwidth used for the NB-IoT is less than or equal to 180 kHz, wherein a value of the first information corresponds to a physical resource block (PRB) index which is a frequency offset value from a center frequency,
wherein the value of the first information identifies one of 14 frequency offset values for a bandwidth having odd numbered PRBs, and
wherein the value of the first information identifies one of 18 frequency offset values for a bandwidth having even numbered PRBs.

4. The method of claim 3,
wherein the second information indicates whether the number of antenna ports for the reference signal of the NB-IoT is either equal to a number of antenna ports for the cell-specific reference signal or to 4.

5. A terminal for transmitting and receiving a signal using Narrowband Internet of Things (NB-IoT) in a mobile communication system, the terminal comprising:
a transceiver configured to transmit and receive a signal; and
a controller configured to:
receive, from a base station, a master information block (MIB) for the NB-IoT, the MIB including at least one of first information on a sequence for a cell-specific reference signal and second information on a number of antenna ports for the cell-specific reference signal,
receive, from the base station, a system information block (SIB) for the NB-IoT, the SIB including third information on a power offset for a reference signal of the NB-IoT, and
receive, from the base station, at least one of the cell-specific reference signal and the reference signal of the NB-IoT based on at least one of the first information, the second information and the third information,
wherein a bandwidth used for the NB-IoT is less than or equal to 180 kHz,
wherein a value of the first information corresponds to a physical resource block (PRB) index which is a frequency offset value from a center frequency,
wherein the value of the first information identifies one of 14 frequency offset values for a bandwidth having odd numbered PRBs, and
wherein the value of the first information identifies one of 18 frequency offset values for a bandwidth having even numbered PRBs.

6. The terminal of claim 5, wherein the second information indicates whether the number of antenna ports for the reference signal of the NB-IoT is either equal to a number of antenna ports for the cell-specific reference signal or to 4.

7. A base station for transmitting and receiving a signal with a terminal using Narrowband Internet of Things (NB-IoT) in a mobile communication system, the base station comprising:
a transceiver configured to transmit and receive a signal; and
a controller configured to:
transmit, to a terminal, a master information block (MIB) for the NB-IoT, the MIB including at least one of first information on a sequence for a cell-specific reference signal and second information on a number of antenna ports for the cell-specific reference signal,
transmit, to the terminal, a system information block (SIB) for the NB-IoT, the SIB including third information on a power offset for a reference signal of the NB-IoT, and
transmit, to the terminal, at least one of the cell-specific reference signal and the reference signal of the NB-IoT based on at least one of the first information, the second information and the third information,
wherein a bandwidth used for the NB-IoT is less than or equal to 180 kHz,
wherein a value of the first information corresponds to a physical resource block (PRB) index which is a frequency offset value from a center frequency,
wherein the value of the first information identifies one of 14 frequency offset values for a bandwidth having odd numbered PRBs, and
wherein the value of the first information identifies one of 18 frequency offset values for a bandwidth having even numbered PRBs.

8. The base station of claim 7, wherein the second information indicates whether the number of antenna ports for the reference signal of the NB-IoT is either equal to a number of antenna ports for the cell-specific reference signal or to 4.

* * * * *